No. 864,707. PATENTED AUG. 27, 1907.
G. G. TALMAGE.
REVERSING AND SPEED CHANGING GEARING.
APPLICATION FILED NOV. 10, 1906.

2 SHEETS—SHEET 1.

No. 864,707. PATENTED AUG. 27, 1907.
G. G. TALMAGE.
REVERSING AND SPEED CHANGING GEARING.
APPLICATION FILED NOV. 10, 1906.

2 SHEETS—SHEET 2.

UNITED STATES PATENT OFFICE.

GEORGE G. TALMAGE, OF WASHTA, IOWA.

REVERSING AND SPEED-CHANGING GEARING.

No. 864,707.  Specification of Letters Patent.  Patented Aug. 27, 1907.

Application filed November 10, 1906. Serial No. 342,826.

*To all whom it may concern:*

Be it known that I, GEORGE G. TALMAGE, a citizen of the United States, residing at Washta, in the county of Cherokee and State of Iowa, have invented certain new and useful Improvements in Reversing and Speed-Changing Gearing, of which the following is a specification.

My invention relates to devices for reversing and changing the forward speed of a driven member relative to the direction and speed of a driving shaft, using only one set of planetary gears, which are always in mesh no shifting of gears required for reversing or changing the forward speed which eliminates all possibility of stripping the gears and allows the applying of the power to the driven member at all times with safety to the device.

My improved gearing will be described in detail hereinafter and illustrated in the accompanying drawings in which—

Figure 1:
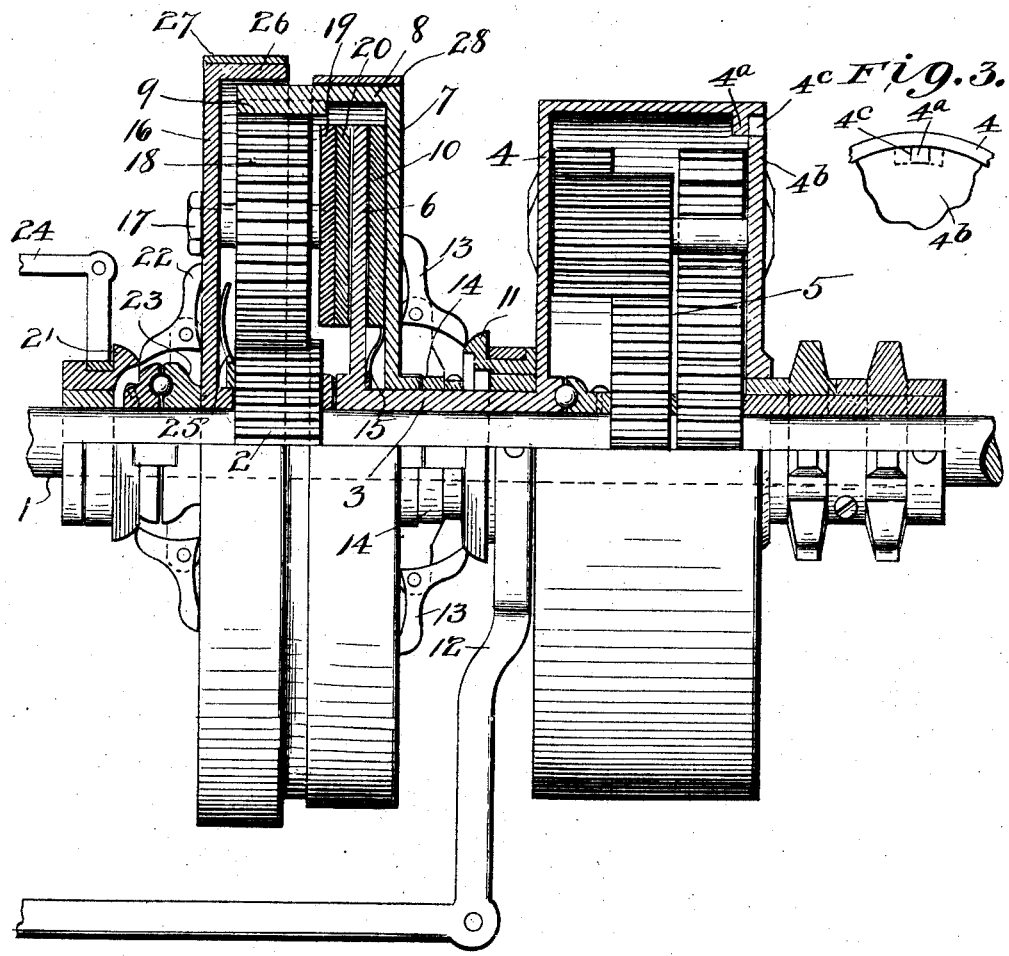
Figure 2:
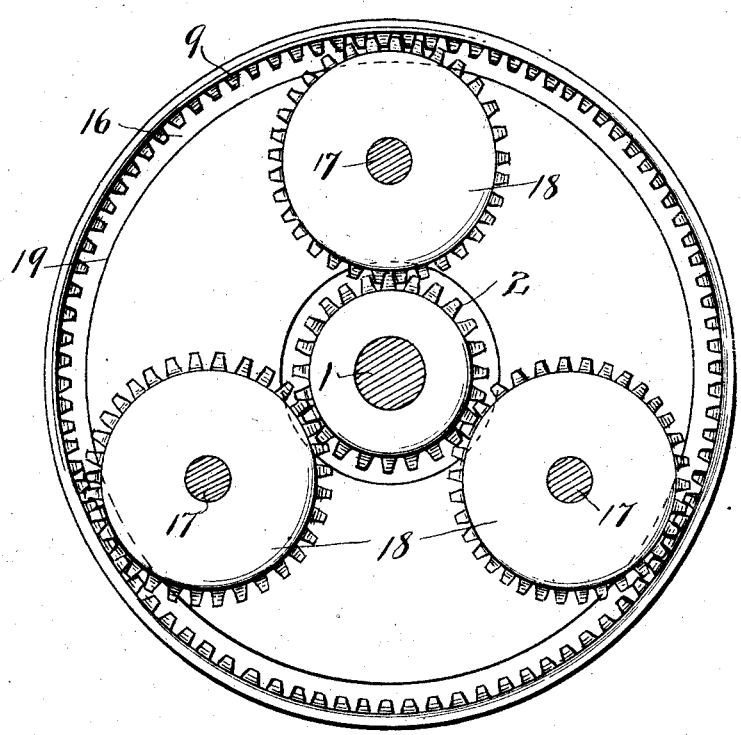

Figure 1 is a view partly in section of my improved gearing, Fig. 2 a cross section, and Fig. 3, a fragmental end view of the differential gear casing.

In the drawings similar reference characters indicate corresponding parts throughout all of the views.

1 indicates the drive shaft on which is keyed a pinion 2.

3 indicates a sleeve revolubly mounted on shaft 1 having one end shaped as the casing or drum 4 of a differential gearing 5.

4ª indicates lugs on drum 4 and 4ᵇ plates forming the end of the drum or casing having notches 4ᶜ to seat on said lugs. 6 indicates a circular flange on the other end of sleeve 3.

7 indicates a disk revolubly and slidably mounted on sleeve 3 having the flange 8 on its outer edge on which is formed gear teeth 9.

10 represents a friction surface of soft metal or other selected material secured to the inner side of disk 7 and adapted to engage flange 6 when the disk is actuated for that purpose by means of a clutch consisting of sliding member 11 actuated by operating lever 12 that engages arms 13 pivotally secured to sleeve 14, the free end of said arms engaging disk 7.

15 represents a spring washer to normally hold the disk 7 in a position so that the friction surface 10 is not in engagement with flange 6. 16 indicates another disk slidably and revolubly mounted on drive shaft 1 having secured thereto stud shafts 17 on which are journaled spur gears 18 that mesh with pinion 2 and gear teeth 9.

19 indicates an annular disk secured to the ends of stud shafts 17 having a friction surface 20 of soft metal or other selected material secured to its outer surface that is adapted to engage flange 6 when the disk 16 is actuated for that purpose by the clutch consisting of the sliding member 21 engaging the arms 22 pivotally secured to sleeve 23, the free ends of the arms 22 engaging said disk 16.

24 indicates the operating lever for actuating sliding member 21 and 25 a spring washer to normally hold the disk 16 in the position that the friction surface 20 does not engage flange 6.

The outer edge of disk 16 is provided with a flange 26 on which is mounted band brake 27 while 28 represents a band brake mounted on flange 8.

In operation if the disk 7 is actuated by its clutch so that the friction surface 10 engages flange 6, and the band brake 27 be set against flange 26, power will be transmitted through pinion 2, spur gears 18 and gear teeth 9 to the disk 7 and from it to flange 6 and sleeve 3 to drum 4 so as to rotate it in a direction reverse to the direction of the shaft 1 and at a slower speed. If on the other hand the band brake 28 be set against flange 8 and the disk 16 be actuated by its operating clutch so that friction surface 20 engages flange 6 then power will be transmitted from pinion 2 to spur gears 18 which would travel around pinion 2, because of their meshing with gear teeth 9, carrying disk 16 and annular disk 19 with them and actuating flange 6, sleeve 3 and drum 4 in the same direction as the drive shaft, but at a reduced speed because of the difference in the sizes of pinion 2 and spur gears 18. When it is desired to drive the drum 4 at the same speed as the shaft both band brakes are left open and both clutches actuated so that both friction surfaces 10 and 20 engage flange 6.

Having thus described my invention what I claim is—

1. In a reversing and changeable speed gearing, a drive shaft, a sleeve mounted on said shaft having one end forming the driving member of a differential gearing, the other end of the sleeve formed with a flange, a pinion keyed to said drive shaft, and means to impart motion to said flange from said pinion, substantially as shown and described.

2. In a reversing and changeable speed gearing, a drive shaft, a sleeve mounted on said shaft having one end forming the driving member of a differential gearing, the other end of the sleeve formed with a flange, a pinion keyed to the drive shaft, a disk revolubly and slidably mounted on the sleeve aforesaid having a flange with gear teeth thereon, said disk to engage the flange on the sleeve, another disk provided with a friction surface revolubly and slidably mounted on the shaft, spur gears journaled on said disk and meshing with the pinion and gear teeth aforesaid, said disk having an annular friction surface connected therewith to engage the sleeve flange, and means to actuate said disks, substantially as shown and described.

3. A reversing and changeable gearing comprising a drive shaft, a pinion keyed to said shaft, a sleeve revolubly mounted on the shaft having one of its ends forming the driving member of a differential gearing, the other end of said sleeve formed with a flange extending laterally therefrom, a disk slidably and revolubly mounted on the sleeve, said disk provided with a friction surface adapted to engage said flange, said disk also provided with a lateral flange extending therefrom having gear teeth formed thereon, a band brake engaging said flange, a disk revolubly and slidably mounted on the drive shaft, stud shafts secured to the disk, spur gears journaled on said stud shafts and meshing with the pinion and gear teeth aforesaid, an annular disk secured to said stud shafts and having a friction surface thereon, the disk carrying the stud shafts provided with a flange extending laterally therefrom, a band brake engaging said flange, and clutches to actuate the disks, substantially as shown and described.

In testimony whereof I hereto affix my signature in the presence of two witnesses.

GEORGE G. TALMAGE.

Witnesses:
MALCOLM McGREGOR,
R. O. BARNES.

Correction in Letters Patent No. 864,707.

It is hereby certified that in Letters Patent No. 864,707, granted August 27, 1907, upon the application of George G. Talmage, of Washta, Iowa, for an improvement in "Reversing and Speed-Changing Gearing," an error appears in the printed specification requiring correction, as follows: Page 1, line 101, the words "provided with a friction surface" should be stricken out and inserted after the word "disk" in line 100, same page; and that the said Letters Patent should be read with this correction therein that the same may conform to the record of the case in the Patent Office.

Signed and sealed this 15th day of October, A. D., 1907.

[SEAL.] EDWARD B. MOORE,

*Commissioner of Patents.*